United States Patent

Fukano et al.

[11] Patent Number: 6,045,889
[45] Date of Patent: Apr. 4, 2000

[54] RECORDING MEDIUM

[75] Inventors: Tatsuo Fukano; Yasuhiko Takeda; Naohiko Kato; Tomoyoshi Motohiro, all of Aichi, Japan

[73] Assignee: Kabushiki Kaisha Toyota Chuo Kenkyusho, Aichi-gun, Japan

[21] Appl. No.: 09/156,866

[22] Filed: Sep. 18, 1998

[30] Foreign Application Priority Data

Sep. 25, 1997 [JP] Japan ................................... 9-260633

[51] Int. Cl.$^7$ ...................................................... B32B 3/00
[52] U.S. Cl. .................. 428/64.1; 428/64.4; 428/698; 428/702; 428/913; 430/270.12; 430/495.1; 430/945; 367/283; 367/288
[58] Field of Search ................................ 428/64.1, 64.2, 428/64.4, 688, 689, 698, 702, 713; 430/270.12, 495.1, 945; 369/283, 288

[56] References Cited

U.S. PATENT DOCUMENTS 5,371,729  12/1994  Yamamoto et al. ..................... 369/126

FOREIGN PATENT DOCUMENTS 59-177539  10/1984  Japan .
61-98595   5/1986   Japan .

*Primary Examiner*—Elizabeth Evans
*Attorney, Agent, or Firm*—Oblon, Spivak, McClelland, Maier, & Neustadt, P.C.

[57] ABSTRACT

A recording medium is for recording information by varying optical characteristic thereof by application of an external energy thereto, and includes a first substance and a second substance. When the external energy is applied to the recording medium, the first and second substances react with each other to form a third substance having a tungsten-bronze crystalline structure, thereby varying the optical characteristic. The third substance absorbs the external energy and varies the reflectivity of the external energy. Thus, the recording medium records information thereon. The recording medium is good in environmental resistance and information retention, because the third substance is stable energetically.

9 Claims, 3 Drawing Sheets

RECORDING MEDIUM

BACKGROUND OF THE INVENTION

1. Field of the Invention

The present invention relates to a recording medium for recording information by varying optical characteristic thereof by application of an external energy thereto.

2. Description of the Related Art

The recording media of this type are, for example, optical recording media which can be represented by a recordable compact disk (i.e., CD-R). In general, the CD-R comprises a substrate, a recording layer (or light absorbing layer) disposed on the substrate, and a reflection layer further disposed on the recording layer. The recording layer includes, for example, an organic pigment. The reflection layer includes, for example, gold or silver. The recording layer is deformed or modified by applying a laser beam as an external source, thereby varying the optical characteristic of the deformed or modified portion and recording information thereon. Then, the information is reproduced optically by utilizing the reflection difference between the recorded portions and unrecorded portions of the recording layer.

However, the above conventional recording layer is formed of organic materials. Accordingly, in view of the costs of the organic materials themselves and the material loss in the manufacturing process, the conventional recording layer suffers from the high manufacturing cost.

In order to solve the problems, there have been several proposals. According to the proposals, inorganic materials which are less expensive than organic pigments are employed to form the recording layer by good cost-performance methods, such as a vapor deposition process and a sputtering process. There have been proposed the following optical recording media employing the inorganic-material recording layers: for example; metal sulfide is used to form the inorganic-material recording layer as set forth in Japanese Unexamined Patent Publication (KOKAI) No. 4-193,586; and sulfar or selenium is used to form the inorganic-material recording layer as set forth in Japanese Unexamined Patent Publication (KOKAI) No. 2-152,029.

The inventors of the present invention investigated into the recording media which employed the inorganic-material recording layers disclosed in the publications. As a result, they found out that the recording media suffered from the following drawbacks in terms of environmental resistance and information retention.

Specifically, the inventors examined the environmental resistance of the recording layer which was made from metal sulfide, for instance, SnS, and on which information was recorded by a laser beam. When the recording layer was subjected to a high-temperature-and-high-humidity condition (for example, at a temperature of 90° C. and in a relative humidity of 80% RH) for a long period of time (for instance, for 240 hours), the recording layer was humidified and swollen to alter. Thus, the information recorded on the recording layer could not be reproduced.

Moreover, in the recording layer employing sulfur, the sulfur was reacted with a metal (for instance, silver), which was included in the reflection layer of the recording medium, to form sulfide (for example, silver sulfide) by using a laser beam. Thus, the optical characteristic of the recording layer is varied to record information thereon. However, the reaction developed gradually to form the silver sulfide when the recording layer was left even at room temperature, because the reactivity of the reaction was high. As a result, the recording layer retained the information unstably.

SUMMARY OF THE INVENTION

The present invention has been developed in view of the aforementioned problems associated with the conventional recording media. It is therefore an object of the present invention to provide a recording medium for recording information by varying optical characteristic thereof by application of an external energy thereto, recording medium which is good in environmental resistance and information retention.

The inventors of the present invention carried out research and development diligently on a diversity of combinations of two substances for the recording media of which the optical characteristic is changed by the reactions of the two substances by the application of an external energy, such as light, heat and impact. As a result, they discovered that the aforementioned object can be achieved when the products (i.e., the third substances) which are produced by the reactions of the two substances have a specific crystalline structure.

In an aspect of a recording medium according to the present invention, the present recording medium is for recording information by varying optical characteristic thereof by application of an external energy thereto. The present recording medium comprises:

a first substance; and a second substance;

the first and second substances reacting with each other to form a third substance by the external energy and to vary the optical characteristic, the third substance having a tungsten-bronze crystalline structure.

The sentence, "the present recording medium comprises a first substance, and a second substance", herein means that the present recording medium comprises one or more of the first substance, and one or more of the second substance; or that the present recording medium comprises a substance including one or more of the first substance and one or more of the second substance.

In accordance with the aspect of the present recording medium, all or part of the first and second substances react with each other when an external energy is applied to them for recording information, and all or part of the first and second substances involved in the reaction form the third substance. At least part of the first and second substances, which have taken part in the reaction and changed chemically, and the resulting third substance contribute to the variation of the optical characteristic to record information.

Note that the aforementioned reaction can take place in one of the following 4 manners:

(1) all of the first and second substances, which have taken part in the reaction, turn into the third substance, which exhibit different optical characteristic from those of the first and second substances. Then, the variation in the optical characteristic due to the third substance results in information recording;

(2) part of the first and second substances, which have taken part in the reaction, turn into the third substance, which exhibit different optical characteristic from those of the first and second substances. The rest of the first and second substances turn into modified products of the first and second substances, modified products which exhibit substantially the same optical characteristics as those of the first and second substances. Then, the variation in the optical characteristic due to the third substance predominantly effects information recording;

(3) part of the first and second substances, which have taken part in the reaction, turn into the third substance, which exhibit substantially the same optical characteristic as those of the first and second substances. The rest of the first and second substances turn into modified products of the first and second substances, modified products which exhibit different optical characteristics from those of the first and second substances. Then, the variation in the optical characteristics due to the modified products predominantly effects information recording; and (4) part of the first and second substances, which have taken part in the reaction, turn into the third substance, which exhibit different optical characteristic from those of the first and second substances. The rest of the first and second substances turn into modified products of the first and second substances, modified products which exhibit different optical characteristics from those of the first and second substances. Then, the variation in the optical characteristics due to the third substance and the modified products predominantly effects information recording.

In the aspect of the present recording medium, the first and second substances react with each other to form the third substance having a tungsten-bronze crystalline structure. The first and second substances can preferably be the following substances.

The first substance can preferably be at least one member selected from the group consisting of oxide, a substance containing oxygen as a constituent element, a substance with oxygen adsorbed, metal, an intermetallic compound, nitride, carbide, silicide, boride, compounds thereof and mixtures thereof. These 11 substances are hereinafter collectively referred to as a substance group "P". Alternatively, the first substance can preferably be a substance which includes at least one member selected from the substance group "P".

The second substance can preferably be at least one member selected from the group consisting of oxide, hydroxide, a substance containing oxygen as a constituent member, a substance with oxygen adsorbed, compounds thereof and mixtures thereof. These 6 substances are hereinafter collectively referred to as a substance group "Q". Alternatively, the second substance can preferably be a substance which includes at least one member selected from the substance group "Q".

Specifically, the first substance can be at least one member selected from the group "P", and can be at least one of the following substances:

(a) a substance including at least one element selected from the group consisting of an element of group 1 of the periodic table of the elements, an element of group 2 thereof, an element of transition elements of the fourth period elements thereof, Y, an element of lanthanide series thereof, Nb, Ag, Zn, Cd, Hg, Al, In, Ge, Pb and Sn;

(b) compounds of the elements recited in (a);

(c) mixtures of the elements recited in (a); and (d) a substance including at least one substance selected from the group consisting of the substance recited in (a), the compounds of the elements recited in (a), the mixtures of the elements recited in (a).

The group-1 element is one of the elements in group 1 of the periodic table of elements, and can be Li, Na, K, and so on, for example. The group-2 element is one of the elements in group 2 of the periodic table of elements, and can be Be, Mg, Ca, and so on, for example. The transition elements of the fourth period elements of the periodic table of elements can be Sc, Ti, V, Cr, Mn, Fe, Co, Ni and Cu. The lanthanide-series element is a general term for the 15 rare-earth elements. The lanthanide series begins from La with atomic number 57, and arrives at Lu with atomic number 71.

Whilst, the second substance can be at least one member selected from the group "Q", and can be at least one of the following substances:

(e) a substance including at least one element selected from the group consisting of Ti, V, Nb, Ta, W, Mo, Rh and Ir;

(f) compounds of the elements recited in (e);

(g) mixtures of the elements recited in (e); and (h) a substance including at least one substance selected from the group consisting of the substance recited in (e), the compounds of the elements recited in (e) and the mixtures of the elements recited in (e).

When the first and second substances are formed of the inorganic materials as described above, the present recording medium can be produced advantageously in view of the manufacturing cost. This is because the inorganic materials are less expensive than the organic materials, such as the organic pigments, which have been employed by conventional recording media, in terms of their own costs. Further, this is also because the inorganic materials can be produced by known processes, such as a vapor deposition process and a sputtering process.

In a further aspect of the present recording medium, the first substance and the second substance can contact with each other. With this arrangement, the reaction of the first and second substances is more likely to occur when the external energy is applied to the present recording medium. Thus, the sensitivity of the present recording medium can be furthermore enhanced.

In a further aspect of the present recording medium, a fourth substance can be further disposed between the first and second substances, fourth substance which exhibits a decomposition temperature of 300° C. or less. With this arrangement, the information retention of the present recording medium can be furthermore upgraded against heat. The term, "decomposition temperature", herein means a temperature at which the fourth substance starts to decompose, sublimate or melt. The fourth substance exhibiting a decomposition temperature of 300° C. or less (hereinafter referred to as an "intervening substance") can be a hydrocarbon, for example.

Specifically, when the present recording medium is heated at or above the decomposition temperature or more, the intervening substance is decomposed, sublimated or melted to enable the first and second substances to react with each other. Thus, information can be recorded. Before recording information, since the present recording medium is held at or below the decomposition temperature, the first and second substances are inhibited from reacting with each other. Consequently, the information retention of the present recording medium can be furthermore upgraded against heat.

The decomposition temperature of the intervening substance is herein set at 300° C. or less. If the decomposition temperature is more than 300° C., the external energy should be enlarged considerably when recording information. Such an enlarged external energy is not practical at all. The decomposition temperature of the intervening substance can preferably fall in the range of from 80 to 300° C., further preferably from 100 to 200° C.

In a further aspect of the present recording medium, the present recording medium can be formed as a multi-layered construction: namely; two layers, for instance, a first layer including the first substance and a second layer including the second substance, can be the constituent elements; or a single layer including both of the first and second substances can be one of the constituent elements at least. With this arrangement, the present recording medium can be formed as a thin disk shape, or a label (or sticker) shape with ease. Thus, the present recording medium can be adequately formed as a recordable compact disk (CD-R).

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

Figure 1:
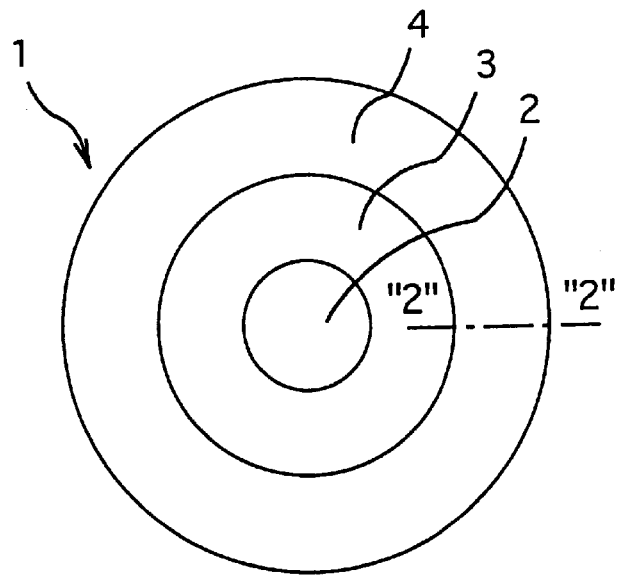
FIG. 1 is a construction diagram illustrating an overall construction of a recording medium of a First Preferred Embodiment according to the present invention.
Figure 2:
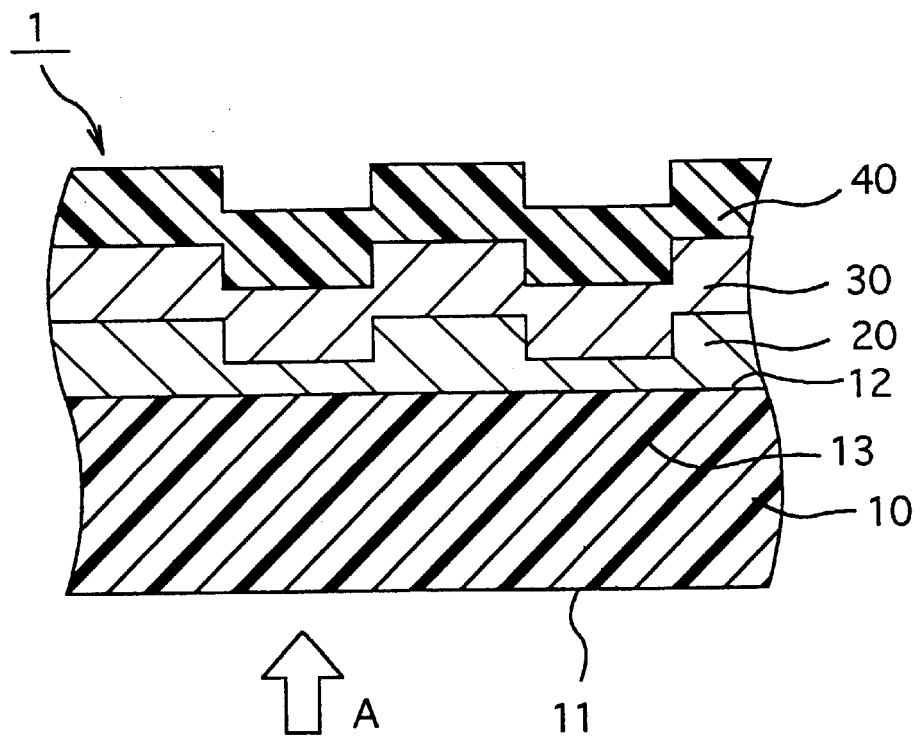
FIG. 2 is a cross-sectional view of the recording medium of the First Preferred Embodiment taken along the line "2"—"2" of FIG. 1.

The present invention will be hereinafter described with reference to the First Preferred Embodiment shown in FIGS. 1 and 2. The recording medium of the First Preferred Embodiment according to the present invention is an optical recording medium which records information by varying the optical characteristic by the reaction of two substances. The reaction is caused by applying a laser beam as an external energy. For instance, the recording medium is applicable to a reproducible CD, or a recordable CD which records music or data as information. FIGS. 1 and 2 illustrate the construction of the recording medium.

As illustrated in FIG. 1, an optical recording medium 1 is formed as a disk as a whole. The disk is provided with a hole 2 formed at the center. The hole 2 is formed for installing the optical recording medium 1 to a CD player. Around the outer periphery of the hole 2, a flat portion 3 is disposed concentrically. No information is recorded on the flat portion 3. Moreover, around the outer periphery of the flat portion 3, a recordable portion 4 is disposed concentrically. The recordable portion 4 takes part in recording and reproducing information.

The cross-section of the recordable portion 4 will be hereinafter described with reference to FIG. 2. FIG. 2 is a cross-sectional view of the optical recording medium 1 taken along the line "2"—"2" of FIG. 1. A transparent substrate 10 is made from polycarbonate, and is formed as a disk having a thickness of 1.2 mm. On the substrate 10, the films hereinafter described are formed successively. A laser beam for optically recording and reproducing information enters into the substrate 10 in the direction specified by the arrow "A" of FIG. 2. One of the opposite surfaces of the substrate 10 (e.g., a surface 11), from which the laser beam enters, is formed as a mirror surface. On the other surface 12, a spiral track 13 or concentric tracks 13 for leading the laser beam are formed.

On the substrate 10, a $WO_3$ film 20 (i.e., the second layer) is formed in a thickness of 190 nm, and can preferably have a thickness falling in the range of from 70 to 290 nm. The $WO_3$ film 20 includes $WO_3$ (i.e., the second substance) in an amount of 100 mol %, and can preferably include it in an amount of from 50 to 100 mol %. The $WO_3$ is an oxide of W (tungsten). On the $WO_3$ film 20, an La film 30 (i.e., the first layer) is formed in a thickness of 50 nm, and can preferably have a thickness falling in the range of from 20 to 70 nm. The La film 30 includes metallic La (i.e., the first substance) in an amount of 100 mol %, and can preferably include it in an amount of from 5 to 100 mol %. The metallic La is one of the lanthanide-series elements. Moreover, on the La film 30, a protective layer 40 is formed in a thickness of 3 $\mu$m. The protective layer 40 includes an ultraviolet-curable resin.

The recordable portion 4 has the cross-sectional construction as described above. Except that no track 13 is formed on the flat portion 3, the flat portion 13 has the same cross-sectional construction as that of the recordable portion 4. Accordingly, the flat portion 3 will not be described hereinafter.

The manufacturing process of the thus constructed optical recording medium 1 will be hereinafter described. The substrate 10 was formed of polycarbonate as a disk shape. One of the opposite surfaces of the substrate 10 was finished to a mirror surface. The track 13 was formed on the other one of the opposite surfaces of the substrate 10 (hereinafter referred to as the "surface 12"). First, the $WO_3$ film 20 was formed on the surface 12, on which the track 13 was formed, in a thickens of 190 nm by an RF (i.e., radio frequency) magnetron sputtering process under the following conditions:

Gas Species: $O_2$ and Ar; $O_2/(Ar+O_2)=0.1$ by pressure;

Sputtering Gas Pressure: $3.0 \times 10^{-3}$ Torr;

Input Electric Power: from 100 to 300 W; and

Sputtering Target: W.

Subsequently, without canceling the vacuum, the La film 30 was formed on the $WO_3$ film 20 in a thickens of 50 nm by an RF sputtering process under the following conditions:

Gas Species: Ar;

Sputtering Gas Pressure: $3.0 \times 10^{-3}$ Torr;

Input Electric Power: from 100 to 200 W; and

Sputtering Target: La.

Finally, the La film 30 was coated with an ultraviolet curable resin by a spin coating process, and was cured by using a high-pressure mercury-vapor lamp. Consequently, the protective layer 40 was formed in a thickness of 3 $\mu$m. Thus, the optical recording medium 1 was completed.

Thereafter, the information (or data) retention of the optical recording medium 1 was examined by carrying out an experiment as follows. Data were recorded on the optical recording medium 1 by focusing a laser beam onto the La film 30 from the side of the mirror surface 11 of the substrate 10. The laser beam had a wavelength of 780 nm, and was irradiated onto the mirror surface 11 through an objective lens having an NA (i.e., a number of apertures) of 0.50 in the following manner:

Linear Velocity: 2.8 m/sec.;

Recording Laser Power: 13 mW;

Recording Frequency: 400 kHz;

Waveform of Recording Laser: Rectangular Wave having a Duty Ratio of 50%.

The thus recorded optical recording medium 1 was examined for the C/N (i.e., Carrier to Noise Ratio) and the reflectivity of the unrecorded portions and recorded portions (i.e., record pits) under the following conditions:

Wavelength of Reproducing Laser Beam: 780 nm; and

Reproducing Laser Power: 0.7 mW;

As a result, the optical recording medium 1 was found to exhibit the following characteristics:

C/N: 50 dB;

Reflectivity of Unrecorded Portions: 63%; and

Reflectivity of Recorded Portions: 12%.

Moreover, the recorded optical recording medium 1 was subjected to an environmental resistance test. In the environmental resistance test, the optical recording medium 1 was held in the following circumstances for 240 hours:

Temperature: 90° C.; and

Relative Humidity: 80% RH.

After the environmental resistance test, the optical recording medium 1 was again examined for the C/N and the reflectivity of the unrecorded portions and recorded portions. As a result, the optical recording medium 1 was found to show no variations in all of the characteristics within the ranges of the measurement errors. Thus, the recorded data retention of the optical recording medium 1 of the First Preferred Embodiment could be verified stable against heat and humidity.

In the optical recording medium 1 of the First Preferred Embodiment, the recording laser beam was absorbed mainly at around the interface between the $WO_3$ film 20 and La film 30, thereby changing the optical energy to heat. The resulting heat induced the reaction between the $WO_3$ film 20 and La film 30. As a result, all or part of the $WO_3$ film 20 and La film 30 reacted with each other, and turned into an $La_xWO_3$ film (wherein x=0.05–1). In the First Preferred Embodiment, the portions which turned into the $La_xWO_3$ film constituted the recorded portions (i.e., record pits), and were formed as pit-like shapes.

The reactant product, $La_xWO_3$ (i.e., the third substance), had a tungsten-bronze crystalline structure. The crystalline structure could be determined by the X-ray diffraction analysis, and so on. The $WO_3$ film 20 was a transparent film. The La film 30 exhibited a metallic gloss. The $La_xWO_3$ film (i.e., the third layer) was colored in blue in the visible region, and was a light-absorbing film.

In the above-described evaluation, the reproducing laser beam was reflected by 63% at the unrecorded portions in the recordable portion 4. On the other hand, the $La_xWO_3$ film absorbed the reproducing laser beam at the recorded portions in the recordable portion 4 into which the recording laser beam entered. Accordingly, the reproducing laser beam was reflected by only 12% at the recorded portions in the recordable portion 4. Specifically, the data were recorded predominantly by the optical characteristic variation due to produced the $La_xWO_3$ (i.e., the third substance). The action enabled the optical recording medium 1 of the First Preferred Embodiment to record data thereon.

As mentioned above, the La is a light reflective substance. Hence, the La film 30, which works as the first layer, not only operates as the recordable layer, but also plays a role of the light reflection layer which outputs the recorded data as the reflectivity variations of the reproducing laser beam.

Further, the overall reaction is an exothermic reaction. Therefore, once the reaction is initiated by the recording laser beam, the energy supply from the recording laser beam can be suppressed. As a result, the sensitivity of the optical recording medium 1 can be enhanced. At the same time, when substances producing large exothermic energies in the reaction are combined, the reverse reactions can be made less likely to take place.

Furthermore, the $La_xWO_3$ is an oxide having a tungsten-bronze crystalline structure which is comparatively stable energetically. Therefore, the $La_xWO_3$, which is responsible for absorbing light: namely; for recording data, is good in term of the heat resistance. As a result, in the optical recording medium 1 of the First Preferred Embodiment, the retention of the recorded data can be upgraded in terms of the thermal stability and humid stability accordingly.

As exemplified by the $La_xWO_3$ (wherein x=0.05–1) described above, the reactant product (i.e., the third substance having a tungsten-bronze crystalline structure) can contain oxygen in an amount which deviates from the stoichiometric amount.

Moreover, in the optical recording medium 1 of the First Preferred Embodiment, the first substance (i.e., La), and the second substance (i.e., $WO_3$) contact with each other in a layered manner. Accordingly, the first and second substances are more likely to react with each other when the recording laser beam enters into the optical recording medium 1. Thus, the sensitivity of the optical recording medium 1 can be furthermore enhanced effectively.

In addition, the optical recording medium 1 is formed as a multi-layered construction. Specifically, both of the first and second substances are layered, and are laminated on the substrate 10. Thus, the size of the optical recording medium 1 can be thinned out. Accordingly, the optical recording medium 1 can properly make a recordable compact disk (CD-R), for instance.

Second Preferred Embodiment

Figure 3:
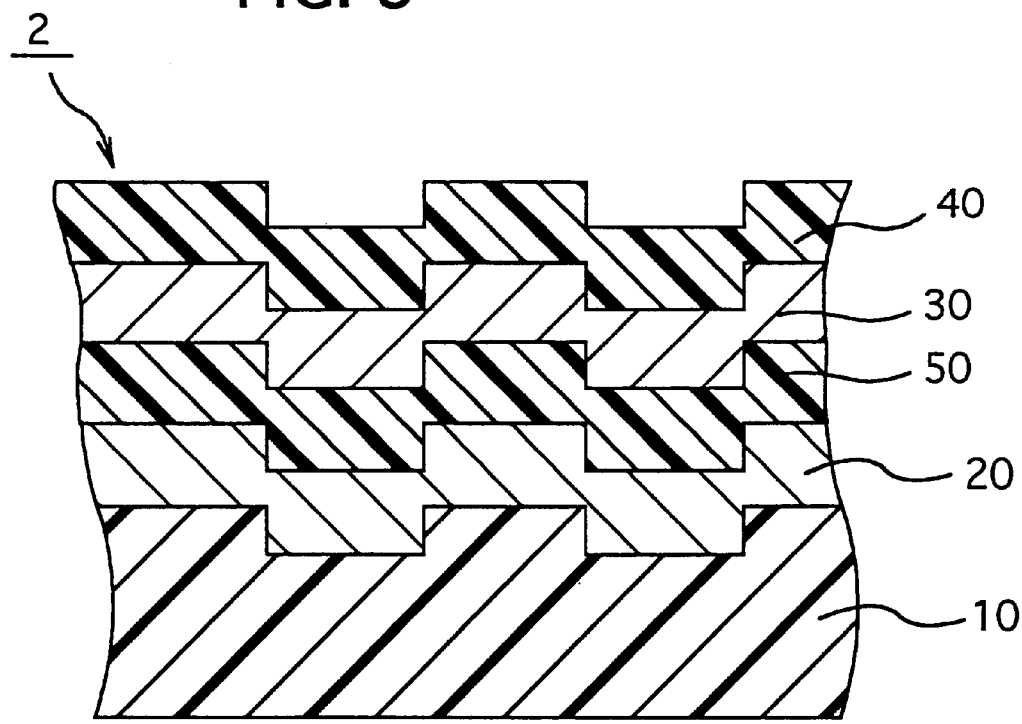
FIG. 3 a partial cross-sectional view of a recording medium of a Second Preferred Embodiment according to the present invention.

The optical recording medium 1 of the First Preferred Embodiment can be modified in the following manner. As illustrated in FIG. 3, a fourth layer 50 can be further disposed between the first layer (i.e., the La film 30) and the second layer (i.e., the $WO_3$ film 20). The fourth layer includes a fourth substance, which exhibits a decomposition temperature of 300° C. or less, in an amount of 100 vol. %, and can preferably include it in an amount of from 30 to 100 vol. %. The fourth substance is hereinafter referred to as an "intervening substance"; the term, "decomposition temperature", herein means a temperature at which the fourth substance starts to decompose, sublimate or melt; and the fourth substance can be a hydrocarbon, for example. If such is the case, due to the reasons described below, the information retention of the optical recording medium 2 can be furthermore upgraded against heat. The fourth layer 50 is formed in a thickness of 2 nm, and can preferably have a thickness falling in the range of from 0.5 to 10 nm.

Specifically, when the thus constructed optical recording medium 2 is heated at or over the decomposition temperature, the intervening substance is decomposed, sublimated or melted to enable the first and second substances to react with each other. Thus, information can be recorded. Before recording information, since the optical recording medium 2 is held at or below the decomposition temperature, the first and second substances are inhibited from reacting with each other.

The decomposition temperature of the intervening substance is herein set at 300° C. or less. If the decomposition temperature is more than 300° C., the power of the laser beam should be enlarged considerably when recording information. Such an enlarged external energy is not practical at all for optical recording media.

Third Preferred Embodiment

Figure 4:
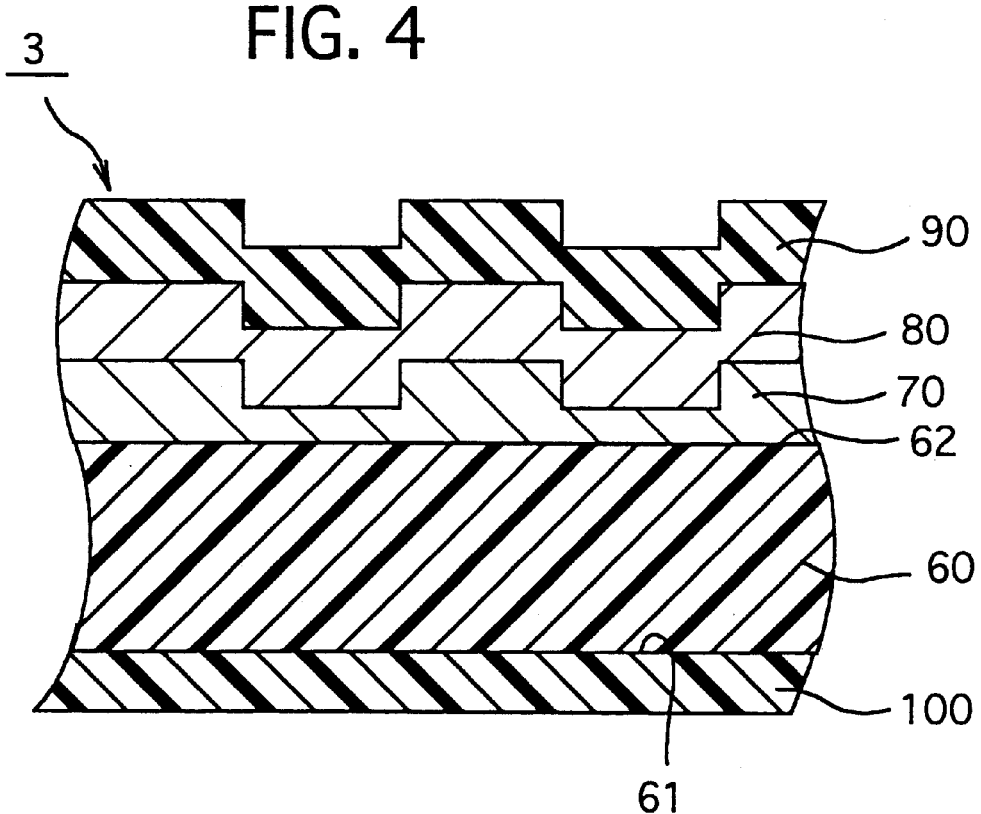
FIG. 4 is a partial cross-sectional view of a recording medium of a Third Preferred Embodiment according to the present invention.

The optical recording medium 1 of the First Preferred Embodiment can be modified in the following manner. As illustrated in FIG. 4, the optical recording medium 3 of the Third Preferred Embodiment includes a substrate 60, an Ag film 70, an $Nb_2O_5$ film 80, a transparent protective layer 90, and a sticky layer 100. Specifically, the substrate 60 is made from PET (i.e., polyethylene terephthalate). On an opposite surface 62 of the substrate 60, the Ag film 70 (i.e., a first layer) is formed in a thickness of 30 nm, and includes Ag in an amount of 100 mol %. On the Ag film 70, the $Nb_2O_5$ film 80 (i.e., a second layer) is formed in a thickness of 160 nm, and includes $Nb_2O_5$ in an amount of 100 mol %. On the $Nb_2O_5$ film 80, the transparent protective layer 90 is formed in a thickness of 5 $\mu$m. On a mirror surface 61 (i.e., the other opposite surface of the substrate 60), the sticky layer 100 is formed in a thickness of 25 $\mu$m.

Consequently, when a laser beam enters into the optical recording medium 3 from the side of the protective layer 90, the Ag operates as the first substance, and the $Nb_2O_5$ operates as the second substance. The Ag and $Nb_2O_5$ react with each other at the interface between the Ag film 70 and $Nb_2O_5$ film 80 to produce $Ag_xNb_2O_5$ (i.e., the third substance) having a tungsten-bronze crystalline structure. Thus, the optical recording medium 3 saves data by the light absorbing action of the $Ag_xNb_2O_5$. After saving information, such as data and images, on the optical recording medium 3, the optical recording medium 3 can make a label which is applied to arbitrary places accordingly.

Fourth Preferred Embodiment

In the optical recording medium 1 of the First Preferred Embodiment, the first and second layers, which are reacted by the external energy, for example, by the recording laser beam, are formed on the substrate 10. The substrate 10 can be obviated as hereinafter described.

Figure 5:
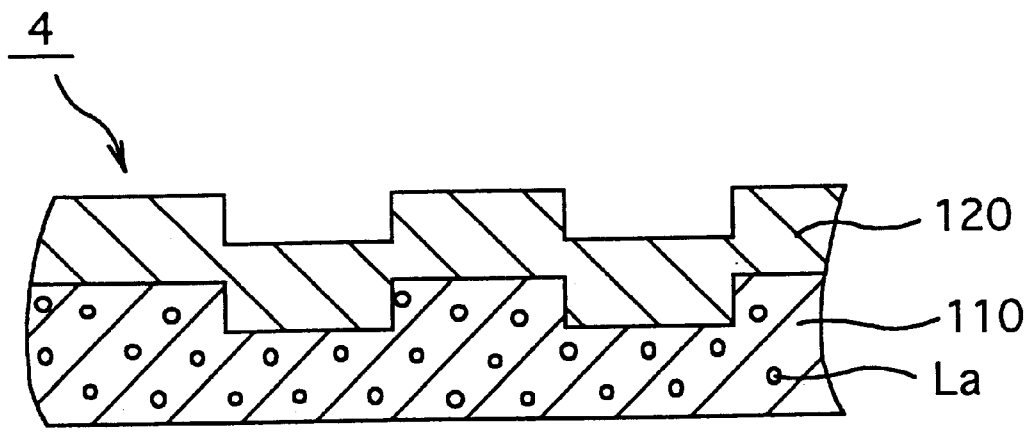
FIG. 5 is a partial cross-sectional view of a recording medium of a Fourth Preferred Embodiment according to the present invention.

For instance, the optical recording medium 4 of the Fourth Preferred Embodiment can be formed as a two-layered construction as illustrated in FIG. 5. The optical recording medium 4 of the Fourth Preferred Embodiment includes an Al foil 110 having a thickness of 50 $\mu$m, and an $MoO_3$ film 120 formed on the Al foil 110 and having a thickness of 100 nm. The Al foil 110 is doped with La (i.e., the first substance). The La is doped in the Al foil 110 in an amount of 2.5 mol %. The $MoO_3$ film 120 contains $MoO_3$ (i.e., the second substance) in an amount of 100 mol %.

Consequently, when an ultrasonic wave working as the external energy enters into the optical recording medium 4 from the side of the $MoO_3$ film 120, the La and $MoO_3$ react with each other to produce $La_xMoO_3$ (i.e., the third substance) having a tungsten-bronze crystalline structure. Thus, the optical recording medium 4 saves data by the light absorbing action of the $La_xMoO_3$. Note that the Al foil 110 works as a light reflection film as well.

Fifth Preferred Embodiment

In the First through Fourth Preferred Embodiments, the multi-layered constructions include the first and second substances which are formed as independent layers. However, the present recording medium can be formed otherwise. For example, the present recording medium can include a layer as one of the constituents in which the first and second substances coexist as particles therein or the first- and second-substance particles coexist by way of a binder. When a recording laser beam is irradiated onto the thus constructed present recording medium, the reaction occurs between the first- and second-substance particles. Thus, the first- and second-substance particles function as the recording medium. Moreover, the intervening substance can be involved in the binder. If such is the case, the intervening substance effects the information-retention ability.

Figure 6:
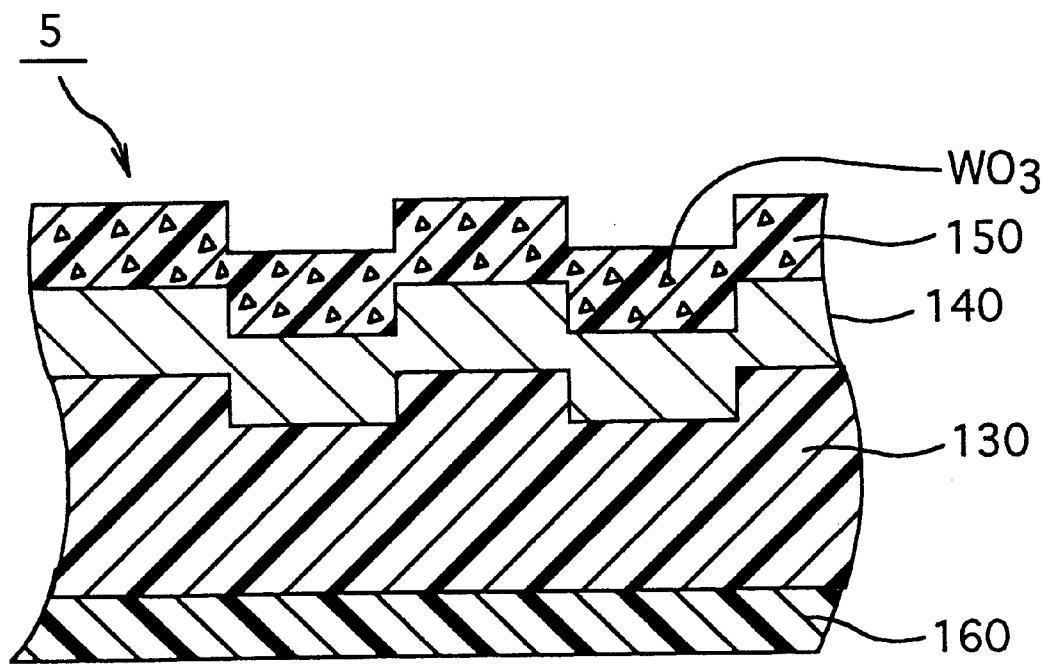
FIG. 6 is a partial cross-sectional view of a recording medium of a Fifth Preferred Embodiment according to the present invention.

For instance, as illustrated in FIG. 6, the optical recording medium 5 of the Fifth Preferred Embodiment includes a PET film 130, a Ce film 140 formed on one of the opposite surfaces of the PET film 130 and having a thickness of 250 $\mu$m, a hydrocarbon film 150 formed on the Ce film 140 and having a thickness of 100 nm, and a heat-resistant sticky layer 160 formed on the other one of the opposite surfaces of the PET film 130 and having a thickness of 30 $\mu$m. The Ce film 140 includes metallic Ce (i.e., the first substance) in an amount of 100 mol %. The metallic Ce is one of the lanthanide-series elements. The hydrocarbon film 150 includes a hydrocarbon, which decomposes at 270° C., in an amount of 60 vol. %. $WO_3$ fine particles (i.e., the second substance) are further dispersed in the hydrocarbon film 150 in an amount of 40 vol. %.

Thus, the hydrocarbon intervenes between the Ce film 140 and the $WO_3$ fine particles, and sensitizes or decomposes at 270° C. Hence, the metallic Ce and $WO_3$ react to produce $Ce_xWO_3$ (i.e., the third substance) having a tungsten-bronze crystalline structure. Accordingly, the optical recording medium 5 can be used as a thermo-label utilizing the variation in the optical characteristic. Namely, when the optical recording medium 5 is subjected to heat working as the external energy, it can record temperature, one of the physical quantities, as data or information thereon.

Note that, in the First through Fifth Preferred Embodiments, the external energy inducing the reaction is not at all limited to the laser beam, ultrasonic wave or heat. The external energy can be, for example, light in general, electromagnetic wave, acoustic wave, ray, impact force, strain, and so on. Moreover, it is naturally possible to properly combine the First through Fifth Preferred Embodiments according to specific applications.

Having now fully described the present invention, it will be apparent to one of ordinary skill in the art that many changes and modifications can be made thereto without departing from the spirit or scope of the present invention as set forth herein including the appended claims.

What is claimed is:

1. A recording medium for recording information by varying optical characteristic thereof by application of an external energy thereto, the recording medium comprising:
   a first substance; and
   a second substance;
   said first and second substances reacting with each other to form a third substance by the external energy and to vary the optical characteristic, the third substance having a tungsten-bronze crystalline structure.

2. The recording medium according to claim 1, wherein said first substance is at least one member selected from the group consisting of oxide, a substance containing oxygen as a constituent element, a substance with oxygen adsorbed, metal, an intermetallic compound, nitride, carbide, silicide, boride, compounds thereof and mixtures thereof.

3. The recording medium according to claim 2, wherein said first substance is at least one substance selected from the group consisting of:

(a) a substance including at least one element selected from the group consisting of an element of group 1 of the periodic table of the elements, an element of group 2 thereof, an element of transition elements of the fourth period elements thereof Y, an element of lanthanide series thereof, Nb, Ag, Zn, Cd, Hg, Al, In, Ge, Pb and Sn;

(b) compounds of the elements recited in (a); and (c) mixtures of the elements recited in (a).

4. The recording medium according to claim 1, wherein said second substance is at least one member selected from the group consisting of oxide, hydroxide, a substance containing oxygen as a constituent member, a substance with oxygen adsorbed, compounds thereof and mixtures thereof.

5. The recording medium according to claim 4, wherein said second substance is at least one substance selected from the group consisting of:

(d) a substance including at least one element selected from the group consisting of Ti, V, Nb, Ta, W, Mo, Rh and Ir;

(e) compounds of the elements recited in (d); and (f) mixtures of the elements recited in (d).

6. The recording medium according to claim 1, wherein said first substance and said second substance contact with each other.

7. The recording medium according to claim 1 further comprising a fourth substance disposed between said first and second substances, the fourth substance having a decomposition temperature of 300° C. or less.

8. The recording medium according to claim 7, wherein said fourth substance is a hydrocarbon.

9. The recording medium according to claim 1, wherein said first and second substances are in the form of a layer.

* * * * *